United States Patent
Liu et al.

(10) Patent No.: US 10,091,700 B1
(45) Date of Patent: Oct. 2, 2018

(54) PRE-EMPTIVE DONOR SELECTION FOR MOVING RELAY NODES

(71) Applicant: Sprint Spectrum LP, Overland Park, KS (US)

(72) Inventors: Chunmei Liu, Great Falls, VA (US); Krishna Sitaram, Chantilly, VA (US); Hemanth Pawar, Brambleton, VA (US); Pratik Kothari, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 111 days.

(21) Appl. No.: 15/154,207

(22) Filed: May 13, 2016

(51) Int. Cl.
*H04W 36/32* (2009.01)
*H04W 36/00* (2009.01)
*H04W 4/02* (2018.01)
*H04W 40/22* (2009.01)
*H04L 12/751* (2013.01)

(52) U.S. Cl.
CPC ............ *H04W 36/32* (2013.01); *H04L 45/02* (2013.01); *H04W 4/025* (2013.01); *H04W 36/0016* (2013.01); *H04W 36/0061* (2013.01); *H04W 36/0083* (2013.01); *H04W 40/22* (2013.01)

(58) Field of Classification Search
CPC ............ H04W 36/00; H04W 36/0016; H04W 36/0022; H04W 36/27; H04W 36/0061; H04W 36/0083; H04W 36/0094; H04W 36/32
See application file for complete search history.

(56) References Cited

U.S. PATENT DOCUMENTS

| | | | |
|---|---|---|---|
| 8,687,590 | B2 | 4/2014 | Cai et al. |
| 2006/0227745 | A1 | 10/2006 | Olvera-Hernandez et al. |
| 2013/0172000 | A1 | 7/2013 | Van Phan et al. |
| 2013/0316712 | A1 | 11/2013 | Lee et al. |
| 2013/0329629 | A1* | 12/2013 | Bao .................. H04W 36/0083 370/315 |
| 2014/0038582 | A1 | 2/2014 | Horneman et al. |
| 2014/0134942 | A1* | 5/2014 | Yu .......................... H04W 24/02 455/7 |
| 2014/0369318 | A1 | 12/2014 | Adjakple et al. |
| 2015/0195757 | A1* | 7/2015 | Tietz ................. H04W 36/0061 455/438 |
| 2015/0230114 | A1* | 8/2015 | Delsol ............... H04W 36/0094 370/252 |
| 2016/0381607 | A1* | 12/2016 | Zhu ................... H04W 36/0072 370/331 |

FOREIGN PATENT DOCUMENTS

WO 2014/079486 A1 5/2014

* cited by examiner

*Primary Examiner* — Ashley Shivers (57) ABSTRACT

Embodiments described herein relate to performing pre-emptive handovers of the backhaul connection of a moving small access node or a relay node that is attached to a mode of transportation traveling along a known or predefined route. The handovers to specific donor access nodes are based at least on a direction of travel, rate (speed) of travel, and current location of the mode of transportation, as well as the presence and coverage areas of the donor access nodes along the known route.

17 Claims, 7 Drawing Sheets

PRE-EMPTIVE DONOR SELECTION FOR MOVING RELAY NODES

TECHNICAL BACKGROUND

As wireless networks evolve and grow, there are ongoing challenges in providing high-quality service to increasing numbers of wireless devices in various coverage areas of a wireless network. One approach to improving service quality and coverage is to deploy small access nodes, such as mini-macro access nodes that function as a relay node for relaying communication from a donor access node, such as a macro base station or eNodeB, to an end-user wireless device. Relay nodes may be used at the edge of a coverage area of a donor access node to improve coverage and/or service, as well as in crowded areas having a high number of other wireless devices to increase the available throughput to the end-user wireless devices being relayed. However, a relay node that does not have a fixed location may be unable to perform handovers fast enough to effectively service end-user wireless devices attached thereto. This is especially true for relay nodes coupled to trains or motor vehicles that are traveling along a predetermined route at a high speed.

OVERVIEW

Exemplary embodiments described herein include systems, methods, and processing nodes for donor selection for moving relay nodes. A method for donor selection includes monitoring a current location and direction of travel of a relay node along a route. When the current location matches a first handover location, the method includes executing a first handover of the relay node from a first donor access node to a second donor access node. The first handover location is determined based on the direction of travel along the route A system for donor selection includes a relay access node for relaying network services from one or more donor access nodes to an end-user wireless device attached thereto. The relay access node is traveling along a predefined route, and includes a processor communicatively coupled to the relay access node. The processor configures the relay access node to execute operations including mapping one or more handover locations with one or more corresponding automatic donor selections from among a plurality of donor access nodes along the predefined route. When a current location of the relay access node matches one of the one or more handover locations, the operations include automatically selecting one of the plurality of donor access nodes as a target for a handover of the relay access node.

A relay node for relaying services to an end-user wireless device includes a processor for enabling the relay node to perform operations including monitoring a current location of the relay node. The relay node is traveling in a specified direction along a route. Upon the current location matching a handover location, the operations include performing a handover from a source donor access node to a target donor access node. The handover is performed independent of a signal measurement.

DETAILED DESCRIPTION

In embodiments disclosed herein, one or more end-user wireless devices are traveling along a predetermined route, i.e. a road or railroad, and are being served by a small access node that is physically coupled to their mode of transportation, such as a motor vehicle. The small access node is connected via a backhaul connection to one of a plurality of donor access nodes, depending on the current location of the mode of transportation, and the coverage area of the donor access nodes. Thus, the small access node relays services from a donor access node to an end-user wireless device within the motor vehicle. The embodiments described herein relate to performing pre-emptive handovers of the backhaul connection small access node, i.e. relay node, to specific donor access nodes, based at least on a direction of travel, rate (speed) of travel, and current location of the mode of transportation, as well as the presence and coverage areas of the donor access nodes along the predetermined route. These and additional operations are further described with respect to the embodiments depicted in FIGS. 1-7 below.

Figure 1:
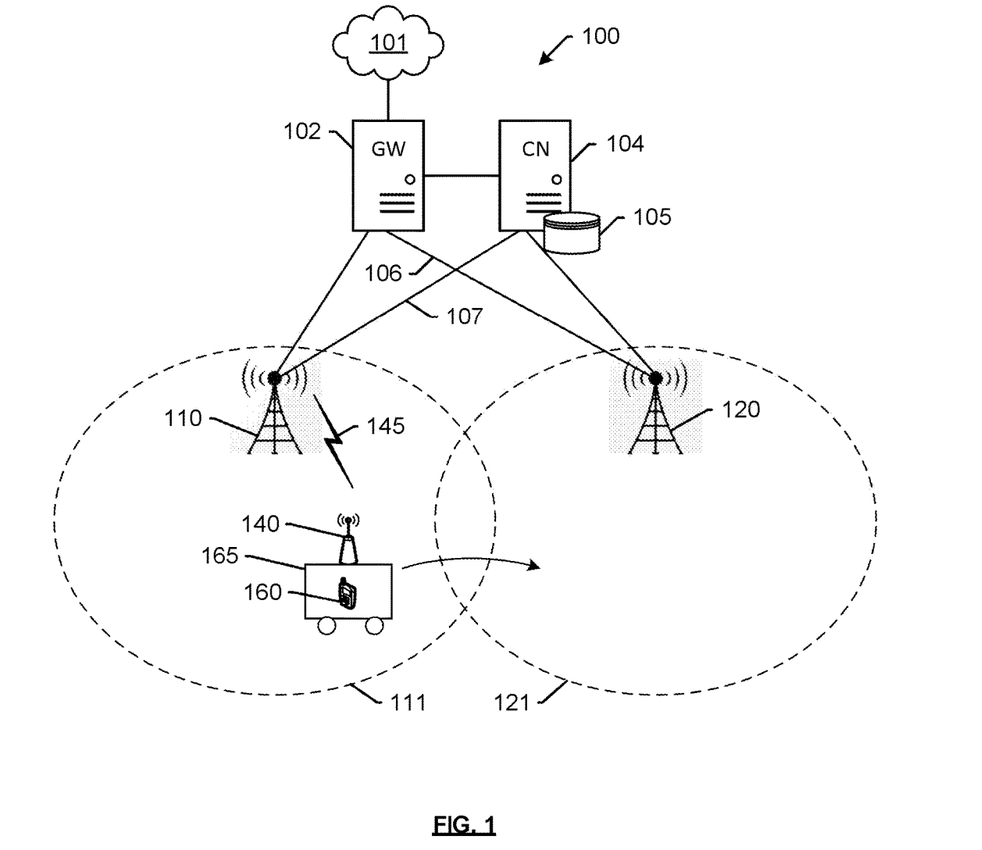
FIG. 1 depicts an exemplary system for pre-emptive handovers of a relay node.

FIG. 1 depicts an exemplary system 100 for pre-emptive handovers of a relay node. System 100 comprises a communication network 101, gateway 102, controller node 104, access nodes 110 and 120, relay node 140, and end-user wireless device 160. Access node 110 is illustrated as having coverage area 111, and access node 120 is illustrated as having coverage area 121. Relay node 140 is physically coupled to a motor vehicle 165 that moves in direction 166 along a predetermined route, such as a road, railroad, waterway, etc. Relay node 140 acts as a wireless access point for end-user wireless device 160, relaying services to end-user wireless device 160 (and other devices that are not shown) from one of access nodes 110, 120. For example, in this embodiment, relay node 140 is connected to access node 110 via air interface 145, which may hereby be referred to as a relay backhaul air interface, or simply "backhaul". Consequently, access node 110 may be referred to as a donor access node. End-user wireless device 160 is located within motor vehicle 165 and, therefore, attaches to relay node 140 in order to access network services from donor access node 110. Motor vehicle 165 may be a car, bus, train, boat, aircraft, or any passenger vehicle or mode of transportation that travels along a fixed or predetermined route 166. Thus, embodiments described herein discuss performing handovers of relay node 140 from donor access node 110 to target access node 120 as motor vehicle 165 moves towards an edge of coverage area 111 and into coverage area 112. The handovers may be performed based on a direction of travel, a presence and number of access nodes 110, 120, a location of motor vehicle 165, and/or a speed of motor vehicle 165. Moreover, the handovers may be performed automatically upon certain triggers being met, without having to undergo traditional handover determination procedures such as signal strength measurements.

Access nodes 110, 120 and relay node 140 can be any network node configured to provide communication between wireless device 160 and communication network 101, including standard access nodes and/or short range, low power, small access nodes. For instance, access nodes 110, 120 may include any standard access node, such as a macrocell access node, base transceiver station, a radio base station, an eNodeB device, an enhanced eNodeB device, or the like. In an exemplary embodiment, a macrocell access node can have a coverage area 111, 121 in the range of approximately five kilometers to thirty five kilometers and an output power in the tens of watts. Relay node 140 can be a small access node including a microcell access node, a picocell access node, a femtocell access node, or the like such as a home NodeB or a home eNodeB device. Moreover, it is noted that while access nodes 110, 120 and relay node 140 are illustrated in FIG. 1, any number of access nodes and relay nodes can be implemented within system 100.

Access nodes 110, 120 and relay node 140 can comprise a processor and associated circuitry to execute or direct the execution of computer-readable instructions to obtain and process information. Access nodes 110, 120 and relay node 140 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. See, for example, FIGS. 2-3 describing types and components of relay nodes. Further, access nodes 110, 120 and relay node 140 can receive instructions and other input at a user interface. Access nodes 110, 120 communicate with gateway node 102 and controller node 104 via communication links 106, 107.

In an embodiment, relay node 140 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 110 are amplified and transmitted respectively by relay node 140 to wireless device 160. Likewise, RF signals received from wireless device 160 are amplified and transmitted by relay node 140 respectively to donor access node 110. Alternatively or in addition, a layer 2 relay device performs a decode and forward (DF) function. RF signals received from donor access node 110 are demodulated and decoded, then encoded and modulated again before being transmitted by relay node 140 to wireless device 160. Likewise, RF signals received from wireless device 160 are demodulated and decoded, then encoded and modulated again before being transmitted by relay node 140 to donor access node 110. Alternatively or in addition, a layer 3 relay device also performs a decode and forward function. However, a layer 3 relay device also performs additional processing (such as ciphering and/or data concatenation/segmentation/resassembly). In other words, relay node 140 performs demodulation and decoding of the received RF signals (either uplink or downlink), processes received data, then encodes, modulates, and transmits the data to wireless device 160.

Wireless device 160 may be any device, system, combination of devices, or other such communication platform capable of communicating wirelessly with access nodes 110, 120 using one or more frequency bands deployed therefrom. Wireless device 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120 and relay node 140. Other types of communication platforms are possible.

Wireless device 160 can comprise a processor and associated circuitry to execute or direct the execution of computer-readable instructions to obtain information. Wireless device 160 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Wireless device 160 can receive instructions and other input at a user interface.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 160, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information about access nodes 110, 120, relay node 140, and location information thereof. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

Figure 2:
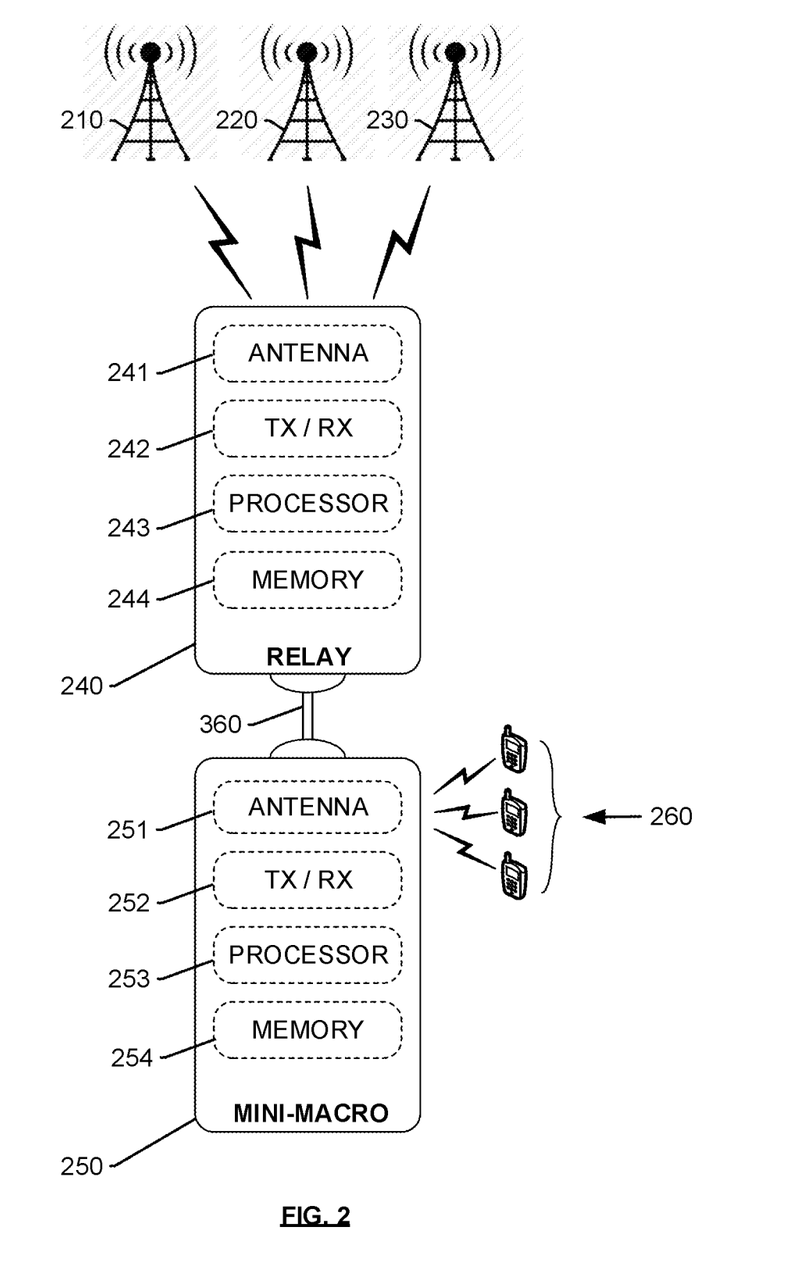
FIG. 2 depicts an exemplary relay node comprising a separate relay device and small access node.
Figure 3:
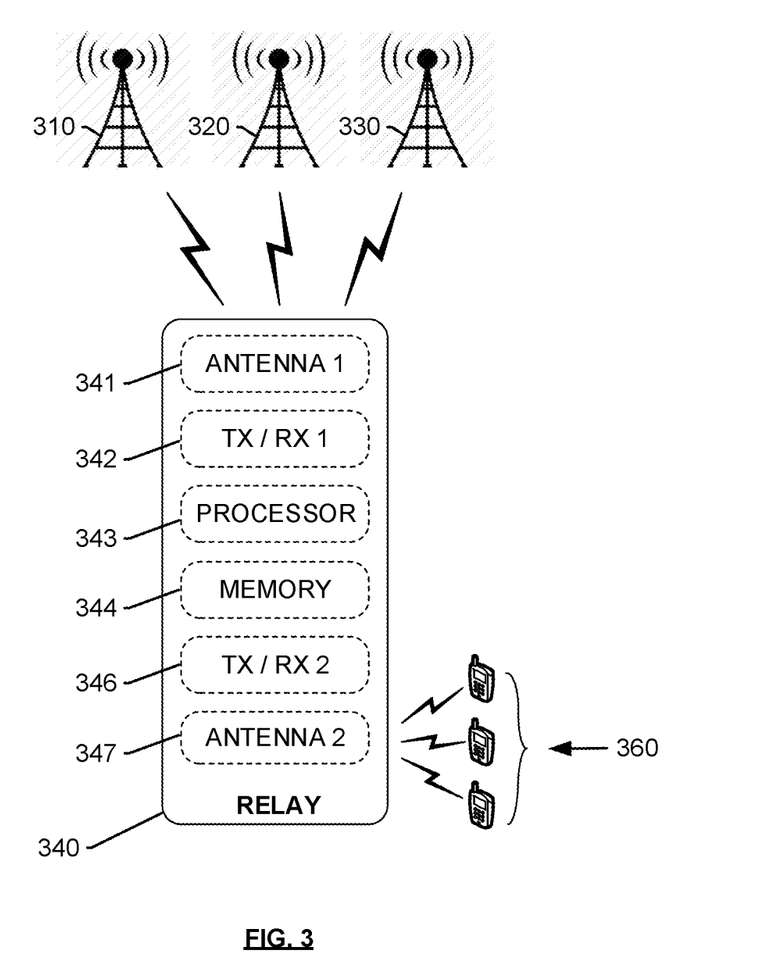
FIG. 3 depicts an exemplary relay node comprising a combined relay device and small access node.

FIGS. 2 and 3 depict alternate configurations of a relay node. For example, FIG. 2 depicts an exemplary relay node comprising a separate relay device (or simply "relay") 240 and a small access node 250. Relay 240 provides a communication path between small access node 250 and one of donor access nodes 210, 220, 230 via an air interface. To enable these features, relay 240 is illustrated as comprising an antenna 241 for direct (i.e. unrelayed) communication with access nodes 210, 220, 230, a transceiver 242, a processor 243, and a memory 244 for storing logical modules that are executed by processor 243 to perform operations further described herein. Further, relay 240 is coupled to small access node 250 via a communication interface 246. Communication interface 246 may be any interface that enables direct communication between relay 240 and small access node 250, such as USB, FireWire, Ethernet, or any other serial, parallel, analog, or digital interface. Small access node 250 is illustrated as comprising an antenna 251 for wireless communication with end wireless devices 260, a transceiver 252, a processor 253, and a memory 254 that stores logical modules for performing operations described herein. Although only one transceiver is depicted in each of relay 240 and small access node 250, additional transceivers may be incorporated in order to facilitate communication across interface 246 and other network elements.

In an alternate embodiment, FIG. 3 depicts an exemplary relay node 340 comprising a combined relay and small access node. Relay node 340 is illustrated as comprising a first antenna 341 for direct communication with donor access nodes 310, 320, 330, a first transceiver 342, a processor 343, a memory 344 for storing logical modules for enabling relay node 340 to perform handover operations described herein, a second transceiver 346, and a second antenna 347 for wireless communication with end-user wireless devices 360. Although only two transceivers are depicted in relay access node 340, additional transceivers may be incorporated in order to facilitate communication with other network elements.

Figure 4:
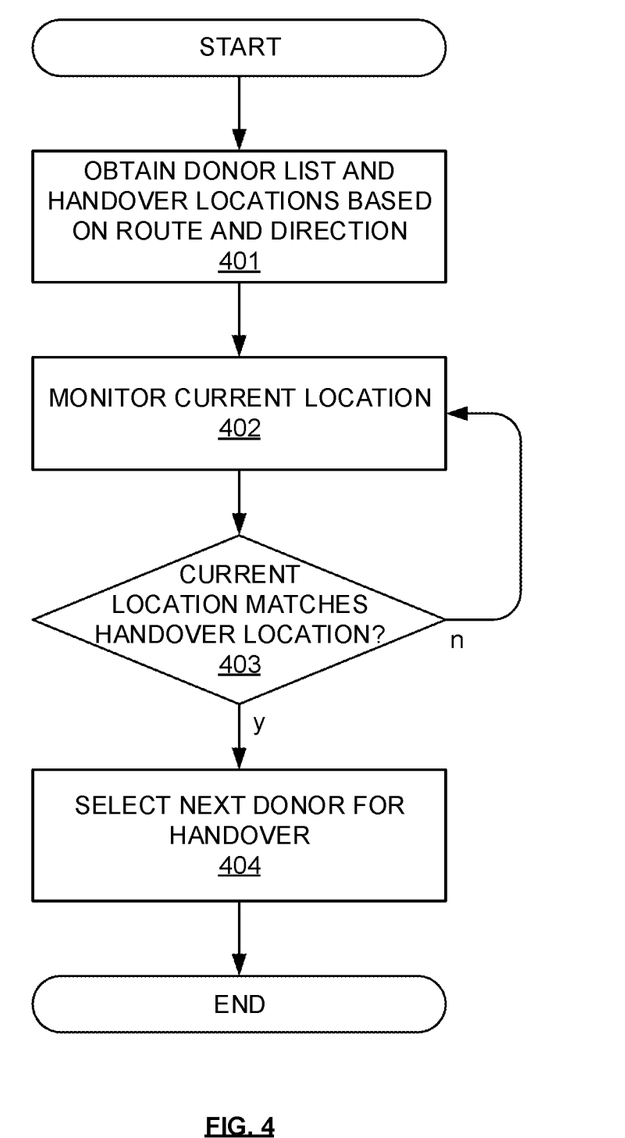
FIG. 4 depicts an exemplary method for pre-emptive handovers of a relay node.

FIG. 4 depicts an exemplary method for pre-emptive handovers of a relay node. The method of FIG. 4 is illustrated with respect to a relay node. In other embodiments, however, the method can be implemented with any suitable network element. Although FIG. 4 depicts operations performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Figure 6:
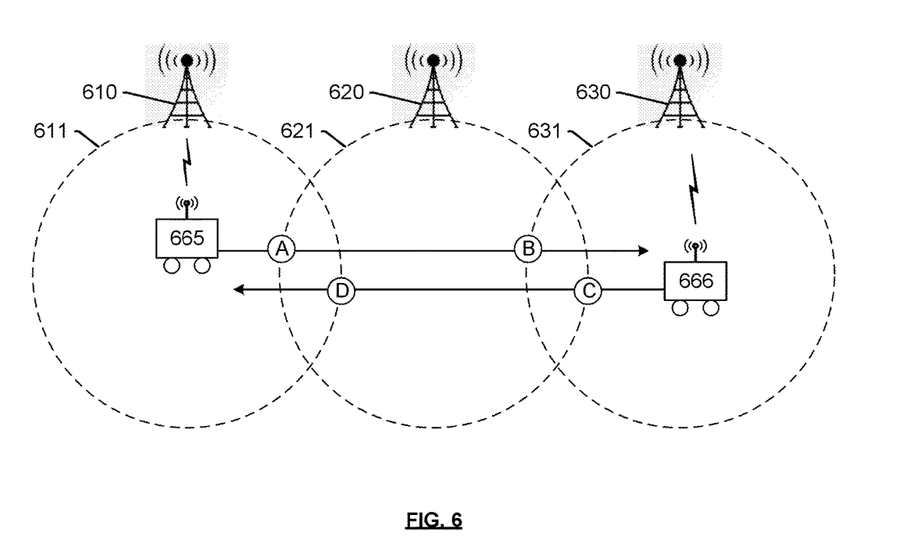
FIG. 6 depicts exemplary handover locations for opposite directions of travel on a fixed route.

At 401, based on a predefined route and direction of travel, a list of donors and handover locations is obtained. For a specified direction of travel along a fixed route, a presence of potential donor access nodes is known by the network. Since each access node has a known approximate coverage area, a preferred handover location may also be determined based on the direction of travel. The handover location may be based on, for instance, an edge of the coverage area of a potential next donor access node, such that the handover is performed prior to the relay node leaving the coverage area of the existing donor access node. See, for example, FIG. 6 depicting exemplary handover locations. Further, this information may be provisioned to the relay node by a network entity, such as a controller node or application server, and stored at the relay node. Alternatively or in addition, the donor list and handover location information may be retrieved on demand by the relay node as and when needed. For example, when the relay node determines a different route or direction of travel, it may obtain a different set of donors and handover locations from the network.

At 402, the current location of the relay node is monitored so as to enable a determination at 403 as to whether or not a handover location is reached. The current location may be monitored based on global positioning system (GPS), triangulation, or any other known or future location determination mechanism. The location may be determined at periodic intervals so as to avoid using excessive resources by constantly monitoring the location. The periodic interval may be small enough to enable fast handovers upon determining that the current location matches the handover location. The interval period may be based on a speed of travel. In either case, at 403, the current location is compared with the known handover locations obtained at 401. For instance, as described herein and with respect to FIG. 6, the donor list and handover locations may be mapped internally at the relay node for a given route and direction of travel. The location information may be stored as a coordinate.

Thus, when the current location matches or is close within a degree to the handover location, a donor on the donor list is selected and a handover procedure initiated at 404. Based on the mapping or table stored on the relay node, the donor selection corresponds to the specific handover location. If the location does not match, then the current location continues to be monitored at 402, and when a match is found at 403, the appropriate donor is selected. Such pre-emptive donor selection is faster than existing techniques, and minimizes the need to perform traditional donor selection steps based on, for instance, signal measurements of the coverage areas of each donor.

Figure 5:
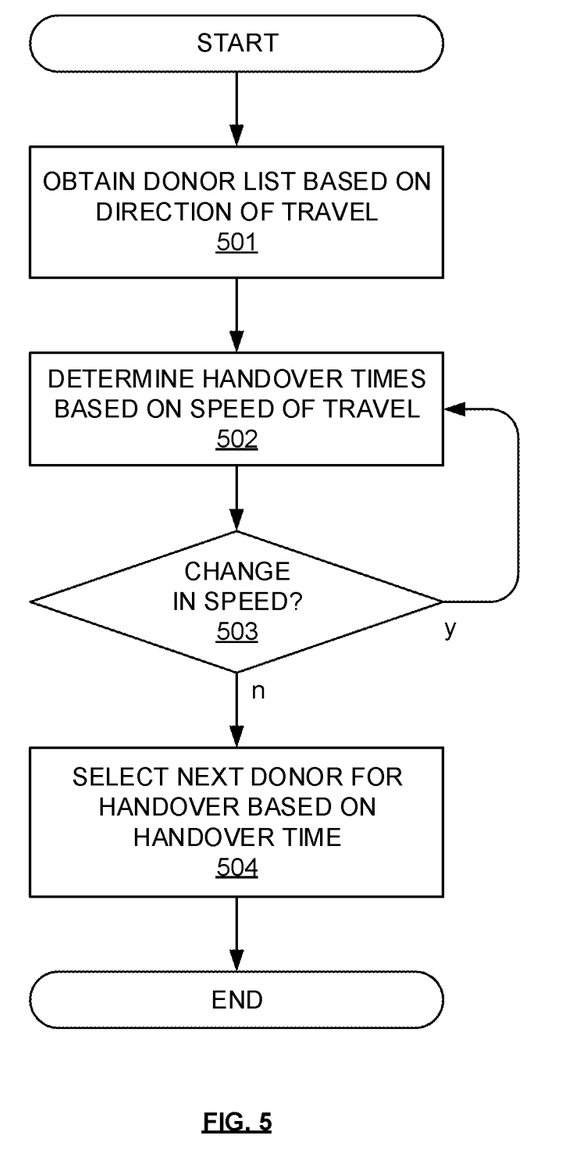
FIG. 5 depicts another exemplary method for pre-emptive handovers of a relay node.

FIG. 5 depicts an exemplary method for pre-emptive handovers of a relay node that can be performed without a location determination. For instance, a location determination mechanism may be unavailable in some situations, such as within tunnels. Thus, FIG. 5 depicts a method for donor selection based on a known speed of travel along a pre-defined route. The method of FIG. 5 is illustrated with respect to a relay node. In other embodiments, however, the method can be implemented with any suitable network element. Although FIG. 5 depicts operations performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 501, based on a predefined route and direction of travel, a list of donors and handover locations is obtained. Similar to the embodiment of FIG. 4, the lists and locations may be provisioned to the relay node by a network entity, such as a controller node or application server, and stored at the relay node. Alternatively or in addition, the donor list and handover location information may be retrieved on demand by the relay node as and when needed. For example, when the relay node determines a different route or direction of travel, it may obtain a different set of donors and handover locations from the network.

At 502, based on a speed of travel, one or more handover times are determined. The handover time may be determined as a function of the distance from the starting point to the location of the donor obtained at 501 and the speed of travel. This assumes a known starting point and a predefined route, such that there are little to no variations in the distances between the starting point and the access nodes. Moreover, the coverage areas of the access nodes may be used to determine a preferred handover location, and the distance between the handover location and the starting point may be used to determine the handover time, based on the speed of travel.

In either case, one or more handover times may be determined at 502, and at 503, if the speed remains within the prescribed or predefined speeds of travel, then the next donor is selected at 504 based on the current time matching the handover time. If, however, there are variations in the speed, for instance due to traffic or other reasons, then the change in speed is used to account for a new handover time at 502. If, at 503, the speed does not change from the previously determined speed that was used to calculate the new handover time, then the next donor is selected based on the new handover time. If variations in speed continue, then new handover times can be calculated in real time, based on the known handover locations and updated speed measurements. In this way, the method is able to execute handovers independent of location determination, and without performing traditional donor selection steps based on, for instance, signal measurements of the coverage areas of each donor.

FIG. 6 depicts exemplary handover locations for opposite directions of travel on a fixed route. The embodiment of FIG. 6 shows three potential donor access nodes 610, 620, and 630, each having a coverage area 611, 621, and 631 respectively. Access nodes 610, 620, and 630 are fixed access nodes, i.e. their location does not change. A vehicle 665 including a relay access node travels along a fixed route from within coverage area 611 to coverage area 631, encountering handover locations A and B. Another vehicle 666 including a relay access node travels along a second fixed route from within coverage area 631 to coverage area 611, encountering handover locations C and D. In other words, vehicle 666 travels in a direction opposite to that of vehicle 665.

Moreover, depending on the direction of travel, relay access nodes on each of vehicles 665 and 666 maintain a mapping of handover locations. Table 1 below shows exemplary mappings of handovers to each specific handover location A, B, C, D, based on a direction of travel.

TABLE 1

| Vehicle | Locations | | | |
| --- | --- | --- | --- | --- |
|  | A | B | C | D |
| 665 | Handover 610 –> 620 | Handover 620 –> 630 | x | x |
| 666 | x | x | Handover 630 –> 620 | Handover 620 –> 610 |

As shown in Table 1, when a current location of vehicle 665 matches location A, a handover is triggered from donor access node 610 to target access node 620. This is based on location A being well within coverage area 611, and entering the edge of coverage area 621. Rather than awaiting measurements of signal strengths at a relay node, a handover is automatically initiated based on the location. Consequently, the handover is performed prior to losing coverage from coverage area 611, thereby ensuring a smooth quality of service for an end-user mobile device traveling within a fast moving vehicle 665. Moreover, the handover need not be performed based on the trigger. Instead, a candidate donor access node such as access node 620 is selected, upon which conventional handover mechanisms (such as a signal measurement, etc.) may be performed. Such pre-emptive target access node selection still outperforms conventional techniques of measuring multiple reference signals and selecting the most optimal. Similar operations are performed for vehicle 665 reaching location B, and for vehicle 666 reaching locations C and D.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, relay node 130, wireless device 160, and/or network 101.

Figure 7:
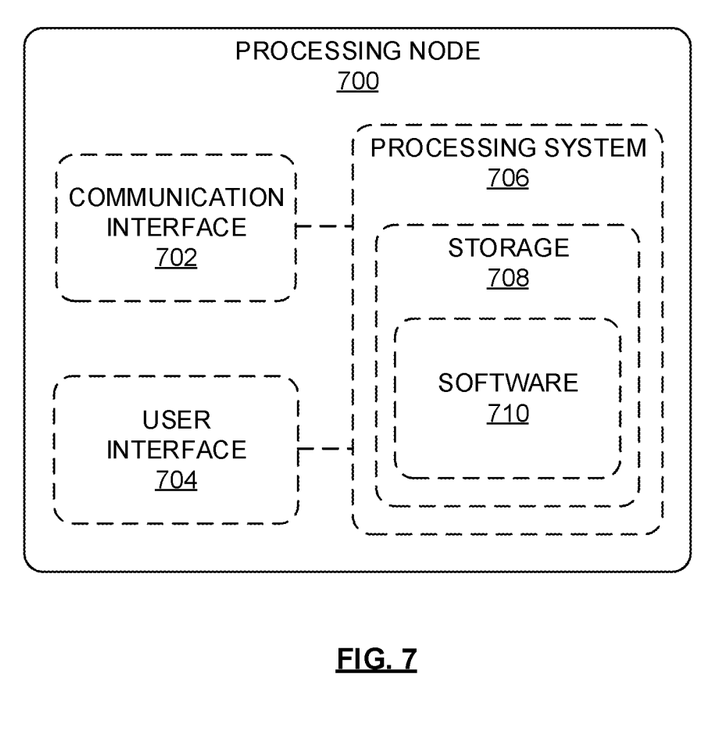
FIG. 7 depicts an exemplary processing node.

FIG. 7 depicts an exemplary processing node 700 comprising communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a scheduling module. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for donor selection in a wireless network, the method comprising:
    monitoring a current location and a first direction of travel of a relay node along a route, wherein the first direction of travel is from a first coverage area of a first donor access node to a second coverage area of a second donor access node, and wherein both first and second coverage areas overlap in a first overlap region; and
    when the current location matches a first handover location, performing a first handover of the relay node from a first donor access node to a second donor access node;
    wherein the first handover location is at an edge of the second coverage area of the second donor access node and within the first overlap region prior to an edge of the first coverage area along the first direction of travel.

2. The method of claim 1, wherein the first handover is performed while the relay node is traveling within the first overlap region.

3. The method of claim 2, wherein the first handover is performed prior to obtaining a signal measurement.

4. The method of claim 1, further comprising performing a second handover of the relay node from the second donor access node to a third donor access node when the current location matches a second handover location.

5. The method of claim 4, further comprising monitoring a second direction of travel from the coverage area of the second donor access node to a coverage area of the third donor access node.

6. The method of claim 4, wherein the second handover location is at an edge of the coverage area of the third donor access node.

7. A system for donor selection in a wireless network, the system comprising:
    a relay access node for relaying network services from one or more of a plurality of donor access nodes to an end-user wireless device attached thereto, wherein the relay access node is traveling along a predefined route within an overlap region of first and second coverage areas of first and second donor access nodes respectively from the plurality of donor access nodes; and
    a processor communicatively coupled to the relay access node, the processor for configuring the relay access node to execute operations comprising:
        mapping one or more handover locations with one or more corresponding automatic donor selections from among the plurality of donor access nodes along the predefined route;
        when a current location of the relay access node matches an edge of the second coverage area of the second donor access node within the overlap region and prior to an edge of the first coverage area along the predefined route, automatically selecting the second donor access node as a target for a handover of the relay access node; and
        performing the handover to the second donor access node.

8. The system of claim 7, wherein the operations further comprise monitoring the current location to determine when the current location matches one or more handover locations.

9. The system of claim 8, wherein monitoring the current location is performed via a global positioning system (GPS).

10. The system of claim 7, wherein each of the one or more donor access nodes has a fixed location.

11. The system of claim 7, wherein the one or more handover locations are obtained from an element management system on the wireless network.

12. The system of claim 11, wherein the one or more handover locations are based on a direction of travel along the predefined route.

13. The system of claim 12, wherein the operations further comprise obtaining a different set of handover locations based on an opposite direction of travel along the predefined route.

14. A relay node for relaying services to an end-user wireless device, the relay node comprising a processor for enabling the relay node to perform operations comprising:
monitoring a current location of the relay node, wherein the relay node is traveling from a first coverage area of a source donor access node to a second coverage area of a target donor access node, wherein both first and second coverage areas overlap in a first overlap region; and
upon the current location matching a handover location at a cell edge of the second coverage area of the target donor access node within the first overlap region and prior to a cell edge of the first coverage area along a direction of travel, performing a handover of the relay node from the source donor access node to the target donor access node;
wherein the handover is performed independent of a signal measurement.

15. The relay node of claim 14, wherein the operations further comprise generating a first table of handover locations based on the specified direction of travel.

16. The relay node of claim 15, wherein the operations further comprise generating a second table of handover locations based on an opposite direction of travel along the route.

17. The relay node of claim 16, wherein a second handover location in the second table is positioned on a cell edge of the source donor access node.

* * * * *